United States Patent [19]
Hirafuji

[11] 3,823,937
[45] July 16, 1974

[54] DEVICE FOR TEMPORARILY RENDERING A CONVEYED SHEET MATERIAL IMPERVIOUS TO THE ACTION OF CONVEYOR MEANS

[75] Inventor: Van Hirafuji, Atsugi, Japan
[73] Assignee: Ricoh Co., Ltd., Tokyo, Japan
[22] Filed: Dec. 29, 1972
[21] Appl. No.: 319,750

[30] Foreign Application Priority Data
Dec. 28, 1971 Japan.............................. 46-36672

[52] U.S. Cl............................271/276, 271/197
[51] Int. Cl............................................ B65h 5/02
[58] Field of Search...... 271/46, 47, 45, 74, DIG. 2, 271/94

[56] References Cited
UNITED STATES PATENTS
1,142,786  6/1915   Kneppler............................. 271/46
3,198,514  8/1965   Barbera et al..................... 271/94 X
3,606,307  9/1971   Herman............................. 271/46
3,698,706  10/1972  Mihojevich et al................. 271/46

Primary Examiner—Evon C. Blunk
Assistant Examiner—Bruce H. Stoner, Jr.
Attorney, Agent, or Firm—Cooper, Dunham, Clark, Griffin & Moran

[57] ABSTRACT

A device mounted above conveyor means comprising a plurality of endless belts trained over a plurality of belt rollers and a sheet suction box disposed between the upper and lower runs of the endless belts for conveying a sheet material placed on the conveyor means while the sheet is drawn by suction to the endless belts. The device comprises at least two sheet material lifting wires trained over the upper run of the endless belt means and aligned with the direction of rotation of the belt, and drive means controlled by drive control means for moving the sheet material lifting means between a stand-by position which is lower than the upper run of the endless belts and an operative position which is higher than the upper run of the endless belts. When in the stand-by position, the sheet material lifting wires permit contact of sheet material with the upper run of the endless belts so that the sheet material on the wires moves with the endless belts; when in the operative position, the wires are spaced apart from the upper run of the endless belts so that the sheet material on the wires is rendered impervious to the action of the conveyor means.

12 Claims, 5 Drawing Figures

3,823,937

DEVICE FOR TEMPORARILY RENDERING A CONVEYED SHEET MATERIAL IMPERVIOUS TO THE ACTION OF CONVEYOR MEANS

BACKGROUND OF THE INVENTION

This invention relates to a device for temporarily rendering a sheet material impervious to the action of conveyor means.

At an original scanning station of a copying machine or the like, a so-called "sheet material conveyor device using an endless belt having a suction box disposed between the upper and lower run of the endless belt" is used as means for conveying a sheet material, such as a photosensitive sheet or an original, and temporarily stopping the movement of the sheet material while maintaining it in a suitably planar condition. In this device, the sheet material placed on the upper run of the endless belt is conveyed by the conveyor belt while being drawn by suction to the belt, and temporarily stops on the endless belt and is held in planar condition on the belt by the action of the suction box when the endless belt stops moving.

In such a device it is required to stop the rotation of the belt rollers when it is desired to stop the movement of the endless belt. This involves the need to control the rotation of the belt rollers, thereby rendering the device complex in construction and high in cost. Besides, there is the disadvantage of the operation of stopping the rotating conveyor rollers not being performed positively.

SUMMARY OF THE INVENTION

This invention has as its object the provision of a device for temporarily rendering a sheet material impervious to the action of conveyor means comprising at least two wires trained over the conveyor means and aligned with the direction of movement thereof, and drive means for moving the wires between two positions relative to the conveyor means whereby a sheet material placed on the wires can be moved by the conveyor means and, if necessary, can be rendered impervious to the action of the conveyor means and stopped temporarily during its movement without stopping the rotation of the belt rollers.

The device according to the invention obviates the aforementioned disadvantages of the prior art and offers many advantages. The device is simple in construction and low in cost. The sheet material can be conveyed and temporarily stopped during its movement without stopping the rotation of the conveyor rollers. Besides, the sheet material can be maintained in good planar condition when it is temporarily stopped in its movement.

DESCRIPTION OF A PREFERRED EMBODIMENT

Figure 1:
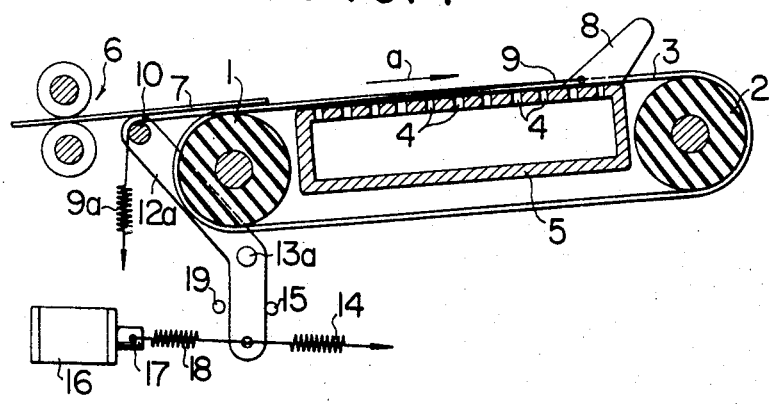
FIG. 1 and FIG. 2 are sectional views showing the device for temporarily rendering a conveyed sheet material free from the action of conveyor means comprising one embodiment of the invention.
Figure 3:
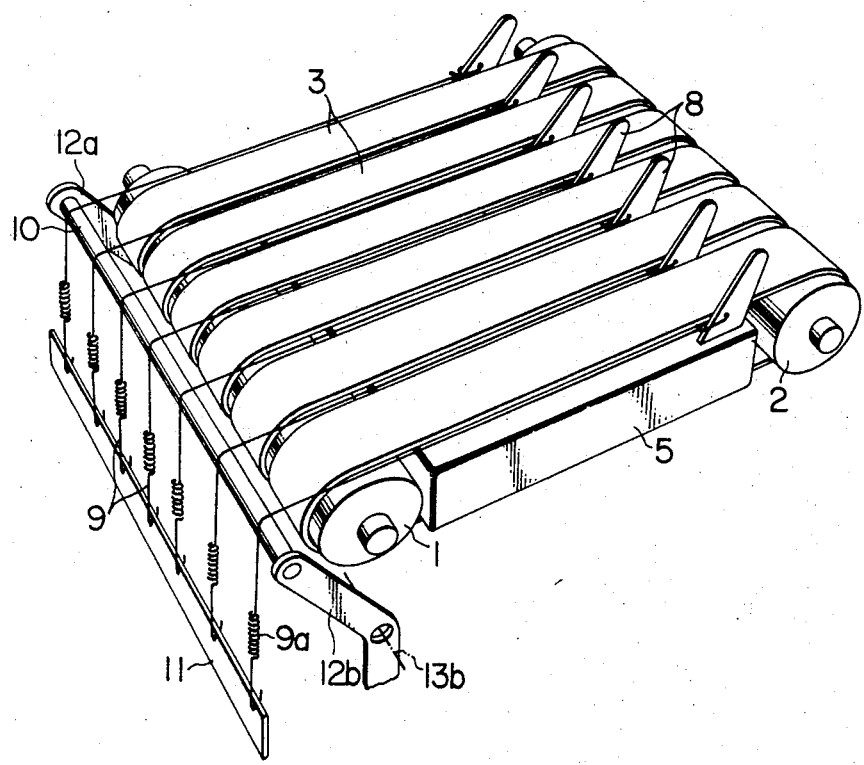
FIG. 3 is a perspective view of the device shown in FIG. 1, showing the details of its construction.
Figure 2:
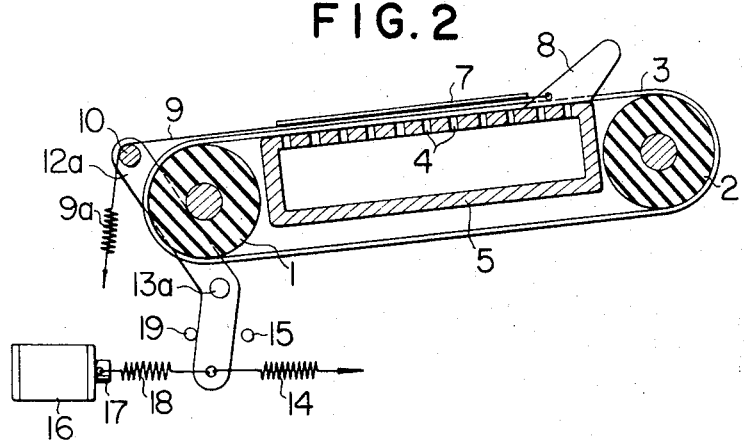

FIG. 1 to FIG. 3 show the device according to the invention as incorporated in a copying machine.

In FIG. 1, a plurality of endless belts 3 (See FIG. 3) are trained over belt rollers 1 and 2, and a sheet material suction box 5 formed in its upper surface with a multitude of openings 4 applying vacuum therethrough to the underside of a sheet material on the upper run of the endless belts is disposed between the upper run and the lower run of the endless belts 3.

Sheet material suction box 5 is connected to a suitable suction pump (not shown) to evacuate the interior of the box so as to render the pressure therein negative or sub-atmospheric. Openings 4 are arranged in a plurality of rows, each row adapted to be disposed between two adjacent endless belts 3. When a single large width endless belt is used in place of the endless belts 3 shown, a large number of openings 4 may be arranged in suitable positions in the top wall of the box 5.

In FIG. 1, each endless belt 3 moves in the direction of an arrow $a$ as drive belt roller 1 rotates. A sheet material 7 delivered by a pair of conveyor rollers 6 is placed on the upper run of endless belts 3 and drawn thereto by the action of suction box 5 while it is conveyed in the direction of arrow $a$.

When the device according to the invention is incorporated in an electrophotographic copying machine, sheet material 7 is an electrophotographic photosensitive sheet comprising an electrically conducting supporter and a zinc oxide or other photocondctor material layer provided on the supporter. Sheet material sheet 7 has its entire photoconductive material layer uniformly charged as by corona discharge while it is being conveyed to endless belts 4.

In FIG. 1, scoop-up members 8 are mounted on suction box 5 in an end portion thereof which is nearer to belt roller 2. Each scoop-up member 8 is disposed on one side of the upper run of each endless belt 3 as shown in FIG. 3. Wires 9 corresponding in number to scoop-up members 8 are each connected at one end to one of scoop-up members 8. Wires 9 perform the function of sheet material lifting means in the invention.

Each wire 9 includes a spring 9a connected at one end to the other end of each wire 9 and at the other end to a fixing bar 11. Wires 9 are thus trained in the same direction as the movement of endless belts 3 and passed over a support rod 10, as that wires 9 are normally disposed in a stand-up position which is lower than the upper run of endless belts 3.

Support rod 10 which is disposed normal to the direction of movement of endless belts 3 is secured at opposite ends thereof to the end of one arm of levers 12a and 12b which are pivotally supported by shafts 13a and 13b respectively secured to support walls (not shown) for rollers 1 and 2. Support rod 10 and levers 12a and 12b constitute drive means.

A spring 14 of low resilience is connected, as shown in FIG. 1 with reference to lever 12a, to the end of the other arm of one of the two levers 12a and 12b so as to urge the two levers to pivot counter clockwise about shafts 13a and 13b respectively. The pivotal movement of lever 12a is limited by a stop pin 15.

A spring 18 connected at one end thereof to an actuator 17 of a solenoid 16 serving as drive control means is connected at the other end thereof to lever 12a at the other arm thereof. When the solenoid is energized, lever 12a is urged to pivot clockwise against the biasing force of spring 14 till it is stopped by a stop pin 19.

Energization of solenoid 16 causes lever 12a to pivot as aforementioned and tensions wires 9 so as to move wires 9 to their operative position which is higher than the upper run of endless belts 3 as shown in FIG. 2. Thus, the sheet material 7 is lifted by wires 9 to a position in which it is not subjected to the action of conveyor means and stops in its movement. It is to be understood that solenoid 16 is energized by sheet material stopping instructions given at a suitable time and remains energized while the instructions are being given.

Even if sheet material 7 stops in its movement in a predetermined position, it is in a suitable planar condition because the suction force of suction box 5 is still exerted thereon. This makes it possible to carry out exposing of a copy sheet to an optical image of an original by means of a well-known original scanning means in the copying machine. Upon completion of the treatment given to sheet material 7, instructions are given to de-energize solenoid 16 which is rendered inoperative, so that lever 12a pivots counter clockwise to move wires 9 to their stand-by position which is lower than the upper run of endless belts 3 as shown in FIG. 1. This permits the action of conveyor means to be exerted on sheet material 7 which is conveyed in the direction of arrow a again by endless belts 3 and removed from the upper run of endless belts 3 by scoop-up means and delivered to a developing station or other station for further treatment.

In the invention, wires 9 may be replaced by a plurality of flexible bars of small width, belts or other string-like members as sheet material lifting means. The drive means shown and described may be replaced by other manually actuated means. Another set of levers similar to levers 12a and 12b may be mounted to support another support rod 10 in a position opposite to levers 12a and 12b with respect to endless belts 3 or near belt roller 2 so as to lift wires 9 near opposite ends thereof. In place of connecting spring 9a to an end of each wire 9, a weight may be attached to one end of each wire 9 to tension the same. This is not necessary, however, if the device is designed such that no greater force than is necessary is exerted on the wires even if levers 12a and 12b pivot.

When a single large width belt is used in place of endless belts 3, only two wires 9 can be used one on each side of the upper run of the endless belt. This arrangement is effective to achieve desired results if the sheet materials handled have a larger width than the distance between the two wires and are of the quality such that they do not buckle off when supported only at opposite sides thereof.

The device according to the invention can be used in the arrangement in which the lower run of endless belts is used as a sheet material bearing surface of the conveyor means, with small adjustments in construction.

Figure 4:
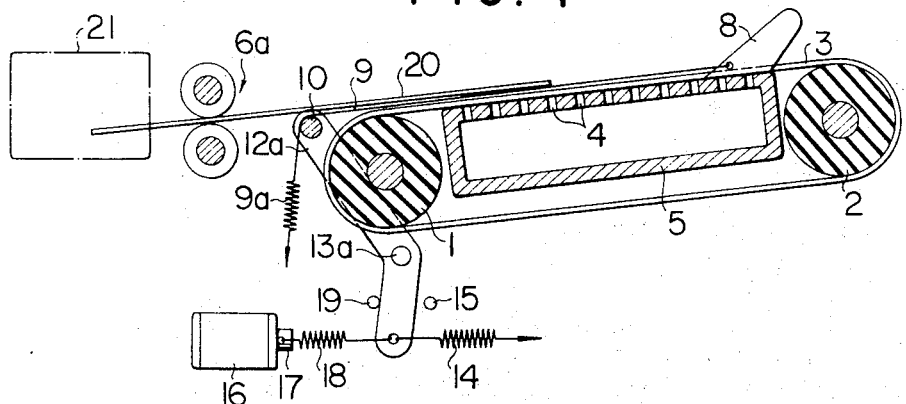
FIG. 4 and FIG. 5 are sectional views of the device according to the invention as incorporated in a facsimile system.
Figure 5:
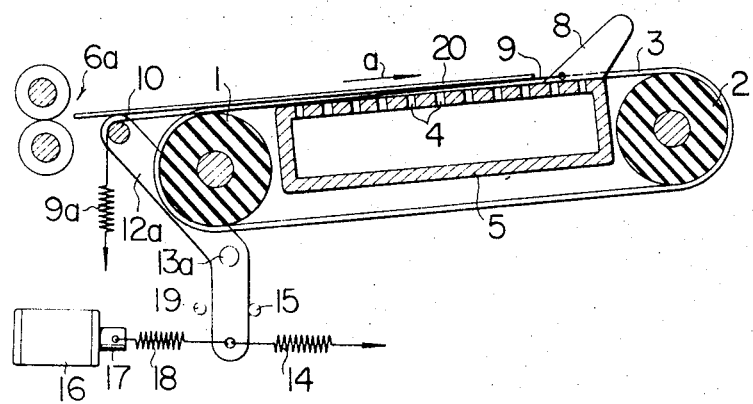

FIG. 4 and FIG. 5 show an embodiment of the invention as incorporated in a facsimile system.

In FIG. 4, solenoid 16 is shown in an operative position in which it has caused lever 12a (and hence lever 12b too) to pivot clockwise about shaft 13a, so that wires 9 are in their operative position. A pair of rollers 6a is adapted to feed a sheet material 20 intermittently in timed relation to recording electrodes in a facsimile recording device 21.

Sheet material 20 is an electrostatic recording sheet comprising an electrically conducting supporter and a dielectric layer, such as a layer of styrene butadiene resin superposed on the supporter. An electrostatic latent image is recorded on sheet material 20 by the action of the recording electrodes.

Rotation of belt roller 1 results in movement of endless belts 3 in the direction of arrow a as shown in FIG. 5, and sheet material 20 is fed intermittently while part of it is still disposed in recording device 21, so that sheet material 20 and endless belts 3 move independently of each other. Moreover, since sheet 20 intermittently moves on wires 9, it is spaced apart from endless belts 3 and free from the action of belts 3.

After the electrostatic latent image is formed on sheet material 20 and sheet material 20 is released from engagement with rollers 6a, solenoid 16 is energized and causes lever 12a (and hence lever 12b) to pivot counter clockwise so as to bring wires 9 to a stand-by position as shown in FIG. 5.

With wires 9 in the stand-by position, sheet material 20 is brought into engagement with endless belts and conveyed thereby in one movement and delivered to a developing device. This arrangement is effective to develop discrete portions of the electrostatic latent image uniformly and obtain a good developed image by eliminating variations in the density of the developed image in the discrete portions which would occur if the sheet material were delivered in intermittent movement in place of one movement to the developing device because of the discrete portions of the image receiving developing for different intervals of time.

From the foregoing description, it will be appreciated that this invention has a wide range of use and can be incorporated in copying machines, facsimile systems and other apparatus.

What is claimed is:

1. In a facsimile system including means for establishing an electrostatic latent image on sheet material while intermittently advancing the sheet material, a sheet material conveyor device disposed at a locality immediately beyond said image-establishing means for receiving intermittently advancing sheet material from said image-establishing means and conveying the material therefrom while imparting continuous motion to the material, including conveyor means comprising endless belts, a pair of belt rollers over which said belts are trained, and a sheet suction box disposed between upper and lower runs of the endless belts for conveying a sheet material by the endless belts while attracting the sheet material to the endless belts by the action of the suction box, a device for temporarily rendering a conveyed sheet material impervious to the action of conveyor means at said locality, said device comprising a. sheet material lifting means disposed at said locality, comprising at least two members disposed alongside and adjacent edges of said endless belts and aligned with the direction of movement thereof, b. drive means acting on at least one end of said sheet material lifting means for moving the sheet lifting means between a stand-by position in which the sheet material lifting means is disposed at a level below that of the upper run of the endless belts and an operative position in which the sheet material lifting means is disposed at a level above that of the upper run of the endless belts; and c. drive control means adapted to be energized upon receiving instructions for rendering said drive means operative to move said sheet material lifting means between said two positions.

2. A device as set forth in claim 1 wherein said sheet material lifting means comprises wires; and further comprising means including a plurality of springs respectively connected to one end of each of said wires, for maintaining said wires under tension throughout movement thereof between said stand-by and operative positions.

3. A device as set forth in claim 1 wherein said drive means comprises a pair of pivotal levers, and a support rod supported by said pair of pivotal levers for supporting said sheet material lifting means, so that the sheet material lifting means is moved between the stand-by position and the operative position through the agency of said support rod.

4. A device as set forth in claim 1 wherein said drive control means is a solenoid.

5. A device as set forth in claim 1 wherein said device is disposed anterior to conveyor roller means for conveying one charged photosensitive sheet after another to said conveyor means.

6. A device as set forth in claim 1 wherein said device is disposed anterior to conveyor roller means for intermittently conveying one electrostatic recording sheet after another to said conveyor means.

7. In a facsimile system including means for establishing an electrostatic latent image on sheet material while intermittently advancing the sheet material and means for developing the image established on the sheet material while the material is advancing in continuous motion therethrough, a sheet material conveying device disposed at a locality immediately beyond said image-establishing means for receiving intermittently advancing sheet material from said image-establishing means and conveying the material therefrom while imparting continuous motion to the material, comprising a. conveyor means comprising
 i. at least one endless belt having a first run for engaging and conveying sheet material to advance the sheet material through and beyond said locality, and a second run, and
 ii. roller means for drivably supporting said one belt;

b. a suction box disposed between said runs of said belt for attracting sheet material toward the first run;

c. at least two elongated members extending in the direction of advance of the belt adjacent opposite sides of said first run for engaging a surface of sheet material advancing on said first run at said locality;

d. drive means engaging said elongated members adjacent an end of said conveyor means for moving said members between an inner position in which said members are disposed inwardly of the surface of said first belt run for permitting sheet material to engage said first run, and an outer position in which said members hold sheet material in outwardly spaced relation to said first run thereby to receive intermittently advancing sheet material from said image-establishing means while holding the material away from the belt; and e. drive control means for actuating said drive means to move said members between said inner and outer positions in response to a control instruction.

8. A device as defined in claim 7, including a plurality of spaced parallel endless belts each having a first run and a second run as aforesaid; and wherein said members comprise a plurality of wires interposed between and extending parallel to the first runs of adjacent ones of said belts.

9. In a sheet material conveying device,
a. conveyor means comprising
 i. a plurality of spaced endless parallel belts each having a first run for engaging and conveying sheet material, and a second run, and
 ii. roller means for drivably supporting said belts;

b. a suction box disposed between said runs of said belts for attracting sheet material toward the first runs;

c. a plurality of elongated wires extending in the direction of advance of the belts, interposed between and extending parallel to the first runs of adjacent ones of said belts for engaging a surface of sheet material advancing on said first runs;

d. drive means engaging said elongated wires adjacent an end of said conveyor means for moving said wires between an inner position in which said wires are disposed inwardly of the surface of said first belt runs for permitting sheet material to engage said first runs, and an outer position in which said wires hold sheet material in outwardly spaced relation to said first runs, said drive means comprising a rod extending transversely of and engaging said wires adjacent one end of said conveyor means, and means mounting said rod for pivotal movement about an axis spaced from and parallel to said rod to effect movement of said wires between said inner and outer positions as aforesaid, said wires being trained over said rod;

e. means for exerting tension on said wires; and f. drive control means for actuating said drive means to move said wires between said inner and outer positions in response to a control instruction, said drive control means comprising means for effecting pivotal movement of said rod as aforesaid.

10. In a sheet material conveying device,
a. conveyor means defining a path of advance of sheet material and comprising
 i. at least one endless belt having a first run for engaging and conveying sheet material, and a second run, and
 ii. roller means for drivably supporting said one belt;

b. a suction box disposed between said runs of said belt for attracting sheet material toward the first run;

c. at least two elongated members extending in the direction of advance of the belt adjacent opposite sides of said first run for engaging a surface of sheet material advancing on said first run;

d. drive means engaging said elongated members adjacent an end of said conveyor means for moving said members between an inner position in which said members are disposed inwardly of the surface of said first belt run for permitting sheet material to engage said first run, and an outer position in which said members hold sheet material in outwardly spaced relation to said first run but subject to attraction by said suction box such that the sheet material is held by suction against said elongated members;

e. drive control means for actuating said drive means to move said members between said inner and outer positions in response to a control instruction; and f. means, disposed ahead of said conveyor means in the path of advance of sheet material, for delivering successive individual sheets of said material to said conveyor means in a direction parallel to major surfaces of the delivered sheets.

11. A device as defined in claim 10, wherein said elongated members are thin flexible members, and further including means for maintaining said flexible members under tension throughout movement of said members between said inner and outer positions as aforesaid.

12. A device as defined in claim 11, including a plurality of spaced parallel endless belts each having a first run and a second run as aforesaid, and wherein said thin flexible members comprise a plurality of members interposed between and parallel to the first runs of adjacent ones of said belts.

* * * * *